Sept. 11, 1928.
W. J. READING
1,683,988
DIRECTION INDICATOR SWITCH FOR AUTOMOBILES
Filed Oct. 29, 1926     2 Sheets-Sheet 1
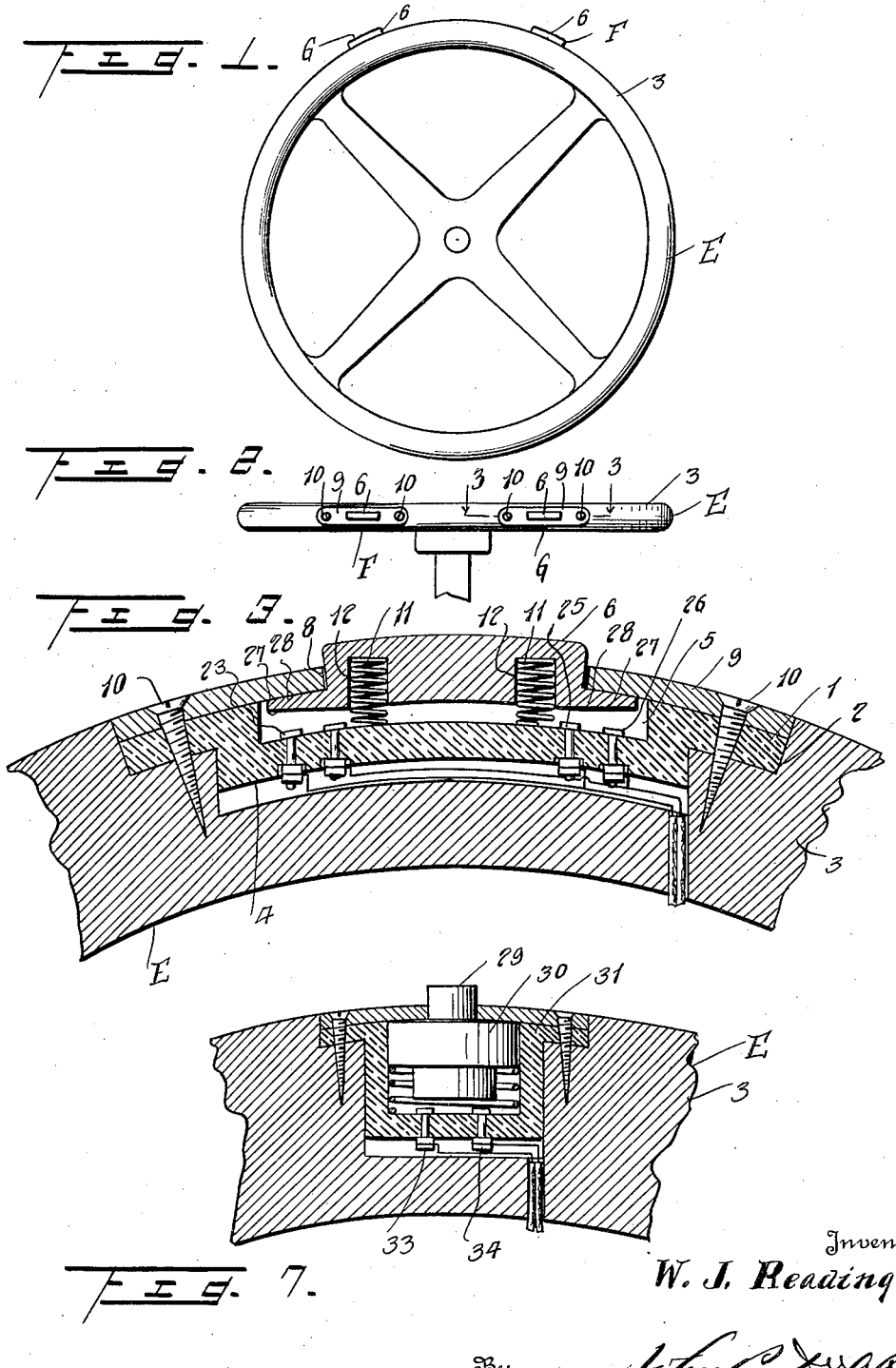

Sept. 11, 1928.  
W. J. READING  
1,683,988  
DIRECTION INDICATOR SWITCH FOR AUTOMOBILES  
Filed Oct. 29, 1926  
2 Sheets-Sheet 2
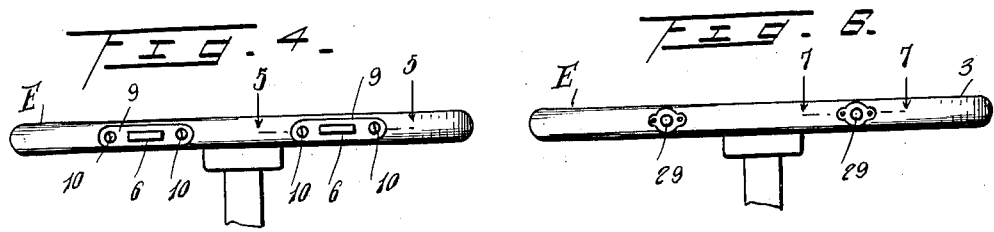
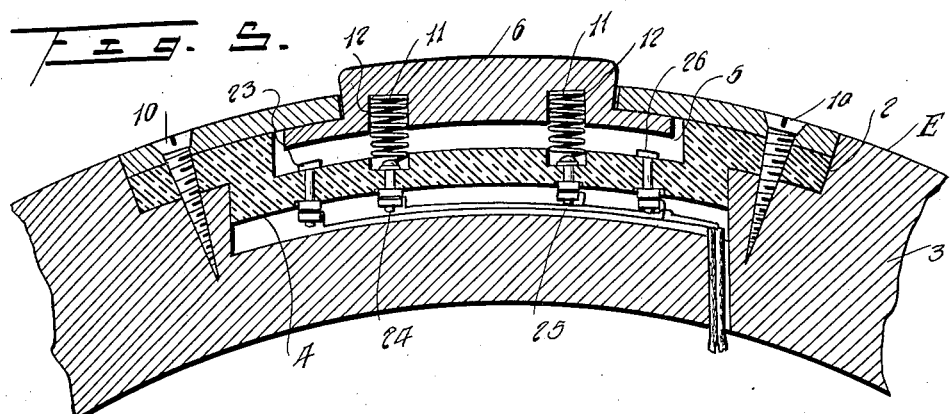
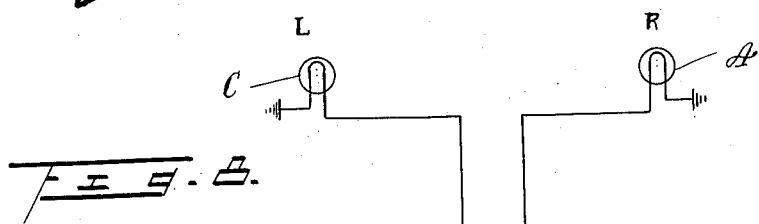
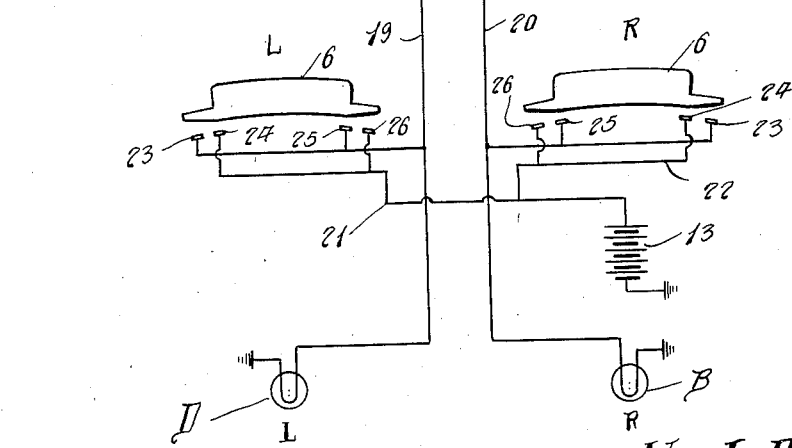
Inventor  
W. J. Reading.
By  
Attorney Patented Sept. 11, 1928.

1,683,988

UNITED STATES PATENT OFFICE.

WALTER J. READING, OF EASTON, PENNSYLVANIA.

DIRECTION-INDICATOR SWITCH FOR AUTOMOBILES.

Application filed October 29, 1926. Serial No. 144,988.

This invention relates to new and useful improvements in direction indicator switches for automobiles.

The primary object of my invention is to provide a direction signal which may be mounted or arranged at the front and back of the automobile and comprises a pair of switches mounted on the steering wheel and suitable electrical connections including proper wiring and a battery or other source of electrical energy for indicating whether or not the machine is to be turned to the "right" or "left". It is claimed that an efficient direction signal of this character will prove highly beneficial both to the pedestrian and driver in that accidents may be greatly reduced if not entirely eliminated.

With the foregoing and other objects in view that will appear as the nature of my invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is a plan view of the steering wheel of an automobile, showing the position of the switches.

Figure 2 is an edge view of Figure 1.

Figure 3 is an enlarged horizontal section, taken on line 3—3 of Figure 2.

Figure 4 is a view similar to Figure 2, with a different form of switch used.

Figure 5 is an enlarged horizontal section, taken on line 5—5 of Figure 4.

Figure 6 is an edge view of a steering wheel, showing still another form of switch.

Figure 7 is an enlarged horizontal section, taken on line 7—7 of Figure 6 and Figure 8 is a diagrammatic view, showing the wiring system.

Referring to the drawings for a more particular description of my invention and in which drawings like parts are designated by like reference characters throughout the several views, A and B designate the front and rear "right" signals, C and D the front and rear "left" signals, E the steering wheel and F and G the "right" and "left" switches, respectively. The signals are mounted at the front and rear of the machine in any suitable way and may be of any desired form. For example, hollow casings may be employed with the words "right" and "left" stenciled thereon and electric lamps situated in the casings in rear of the aforesaid stenciled words.

Each switch comprises a base 1 of bakelite, hard rubber or other suitable insulating material which is arranged in a corresponding recess 2 in the rim 3 of the steering wheel E. This base comprises an intermediate elongated off-set portion 4 which is curved to conform with that of the rim and forms or provides a central arcuate chamber 5 in which is operatively mounted the movable contact or circuit closing plate 6. The body portion 7 of this plate extends through and slightly beyond a slot 8 formed in the keeper plate 9 which is curved to conform with the curvature of the steering wheel rim and is mounted in the rim with its outer face flush or substantially flush with the corresponding edge of the rim. The base 1 and keeper plate 9 are fastened in place by two wood screws 10 and the circuit closing plate 6 is normally held in spaced relation with the base by the coil springs 11 or other equivalent means, which are fastened at their inner ends to the outer wall or face of the off-set portion of the base and extend into corresponding sockets 12 formed in the inner or back wall of the circuit closing plate.

In carrying out my invention, suitable electrical connections are provided for closing the circuit through the electric lamps of the signals A and B or the electric lamps of the signals C and D, as desired, in order to indicate to pedestrians or other drivers that the machine is about to turn to the right or left. These connections include a battery 13 or other source of electrical energy, the circuit wires 19, 20, 21 and 22, and the contacts 23, 24, 25 and 26. The contacts 23 to 26, inclusive, are located along the outer face of the off-set portion of the base 1 of each switch and are engaged by the corresponding circuit closing member 6 when depressed in order to close the circuit through the electric lamps of the corresponding signals. It will be noted that the inner faces 27 of the ends 28 of the circuit closing plates are slightly beveled outwardly with the result that the circuit will be closed through the electric lamps of the corresponding signals when one of the plates is depressed, regardless of whether the aforesaid plate is depressed evenly or unevenly, that is to say, caused to tilt at either end.

In the modified form of my switch illustrated in Figures 4 and 5 of the drawings, the ends of the circuit closing plate are not beveled but of uniform thickness, as shown. In this form of switch, the circuit closing plate will also function to close the circuit through the corresponding lamps of the signals whether depressed evenly or unevenly because of the arrangement of the coil springs 11'. The circuit closing plates are depressed merely by grasping the rim of the steering wheel with the natural grip when preparing to turn. It will be understood that the switches may be arranged at the inner or outer edge of the rim of the steering wheel or at the top or bottom of the rim or other convenient or suitable point. It will also be understood that I do not limit myself to the particular wiring arrangement shown, as this is merely to illustrate one workable method by which my invention may be carried out.

In the modified form of my invention illustrated in Figures 6 and 7, the switch is of the general push button type, comprising the outwardly projecting stem 29, cylindrical body portion 30 which works in the corresponding base or housing 31 and contact head 32 which closes the circuit through the contacts 33 and 34.

From the foregoing description taken in connection with the drawings, it is thought that the construction, operation and advantages of my invention will be readily understood without requiring a more extended explanation.

Having described my invention, what I claim as new and desire to secure by Letters Patent, is:

In a signal control device, a steering wheel having a recess therein, a hollow base of insulating material mounted in said recess, a plurality of pairs of contacts carried by and spaced along the base, a circuit closing plate having a flange extending into the hollow of the base, the inner face of the flange being beveled, recesses in said plate resilient means in the recesses between the base and the plate normally holding the latter in spaced relation with respect to the contacts, an arcuate keeper plate secured over the base and having an opening through which the outer portion of the circuit closing plate extends and confining the flange within the hollow of the base, and fastening means for securing the closing plate and the base to the steering wheel.

In testimony whereof he affixes his signature.

WALTER J. READING.